United States Patent Office 3,588,949
Patented June 29, 1971

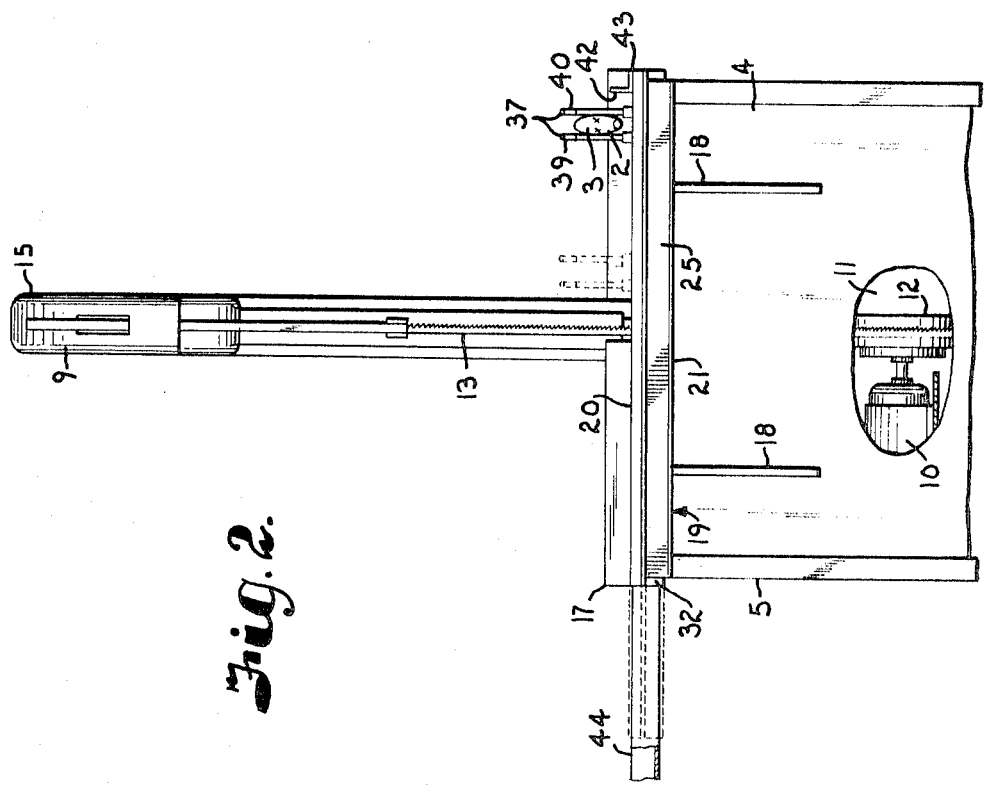
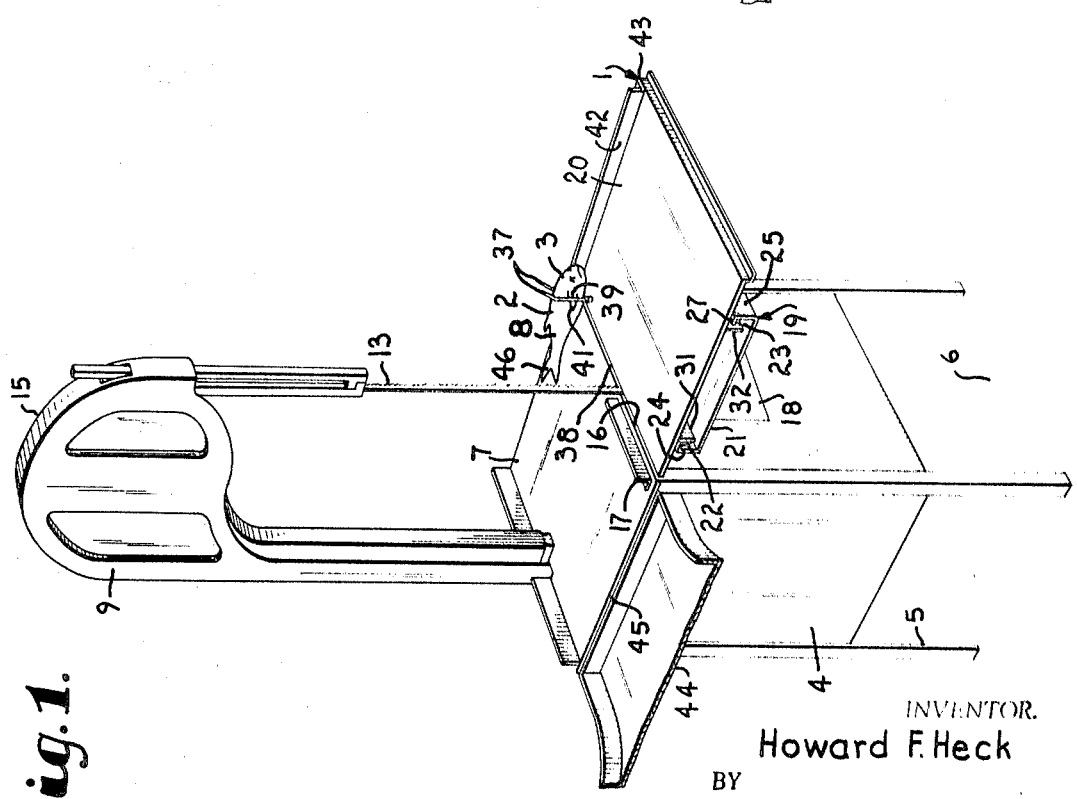
INVENTOR.
Howard F. Heck

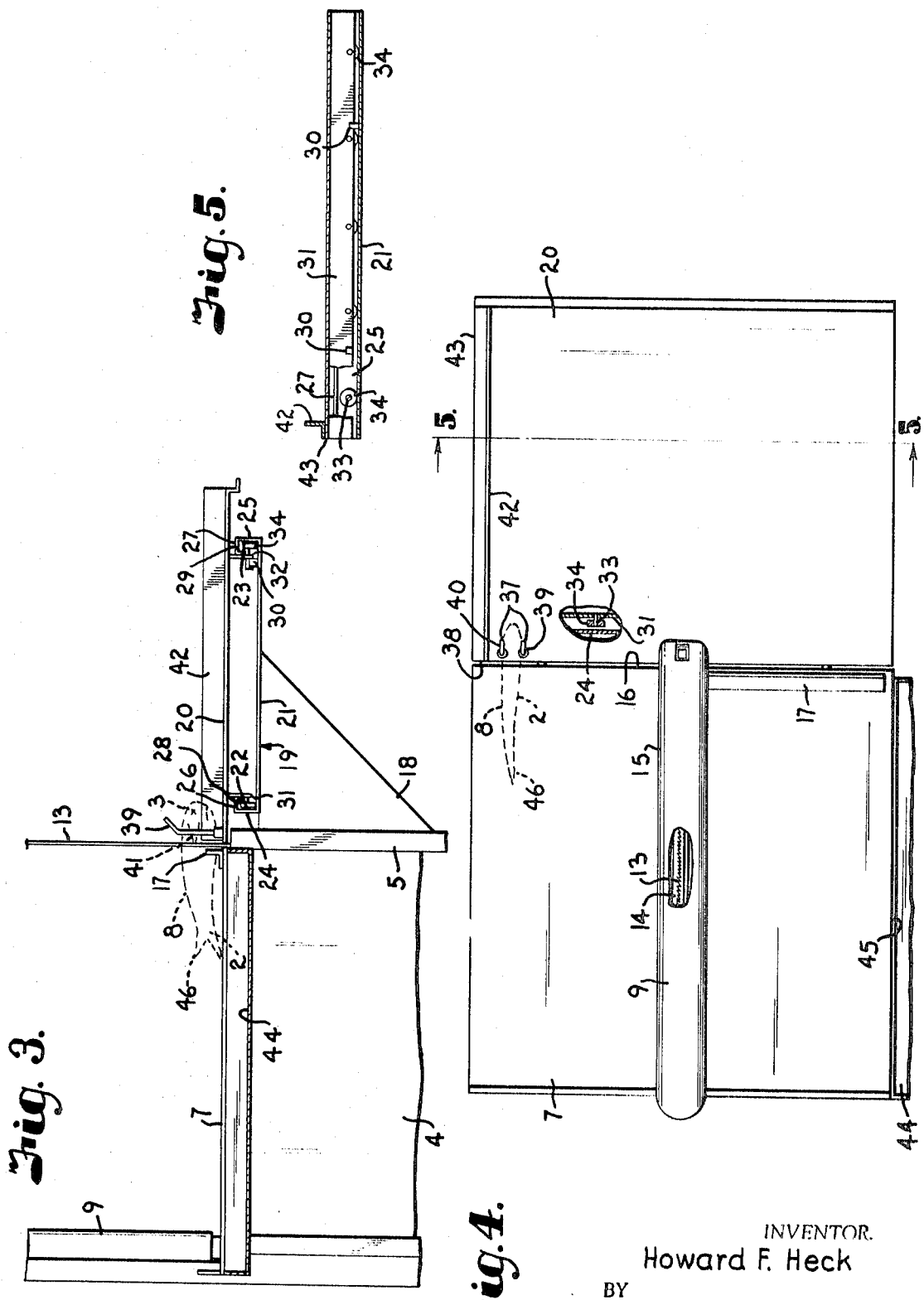

3,588,949
APPARATUS FOR REMOVING FISH HEADS
Howard F. Heck, 107 W. 7th St.,
Lawrence, Kans. 66044
Filed July 22, 1969, Ser. No. 843,475
Int. Cl. A22c 25/14
U.S. Cl. 17—63                                 6 Claims

ABSTRACT OF THE DISCLOSURE

An apparatus for removing fish heads by cutting transversely through the fish at a location to include the gall bladder within the severed head portion thereof has a movable member for supporting a head portion of the fish and pectoral fin engaging members on the movable member to position the head portion relative to a cutter whereby, when the fish and the movable member are moved toward and beyond the cutter, the head portion is severed.

A method of removing fish heads as a step in the dressing of fish comprises pulling a fish by the tail to move rear sides of pectoral fins into firm engagement with spaced upright rods thereby holding a head portion in a fixed position while moving the fish into engagement with cutting means to sever the head portion from a body portion of the fish at a location substantially on a plane adjacent said pectoral fins whereby the gall bladder is in the head portion removed from the fish body.

---

The present invention relates to the fish processing industry and more particularly to apparatus for removing fish heads from the body so as to minimize waste yet have the gall bladder in the removed head portion.

Heretofore in the dressing of fish, the head was removed by cutting through the fish at the gills and the gall bladder was removed manually prior to other cleaning. It has been found that the gall bladder is slightly toward the head from the pectoral fins of the fish and, when the fish is cut transversely through the body immediately rearwardly of the pectoral fins, the gall bladder will be in severed head portion. Such a transverse cut will include only a negligible amount of edible flesh.

The principal objects of the present invention are: to provide an apparatus and method for removing fish heads with the gall bladder therein; to provide such an apparatus and method by which a fish is quickly and accurately positioned for removing fish heads at a location immediately behind the pectoral fins of the fish; to provide such an apparatus and method for removing fish heads wherein the fish is held in a selected position on a movable member whereby when the fish is moved toward and beyond cutting means the fish is cut at a location to include the gall bladder within the severed head portion; to provide such an apparatus and method for removing fish heads which positions the severed head portions and body portions at separate locations; to provide such an apparatus and method for removing fish heads which is adapted for production dressing of fish wherein any edible flesh removed will be negligible; and to provide such an apparatus for removing fish heads which is economical to manufacture, durable in use, simple and safe in operation, and particularly well adapted for the proposed use.

Other objects and advantages of this invention will become apparent from the following description taken in connection with the accompanying drawings wherein are set forth by way of illustration and example certain embodiments of this invention.

FIG. 1 is a perspective view of an apparatus for removing fish heads embodying features of the present invention.

FIG. 2 is a side elevational view of the fish head removing apparatus showing an alternate position of a movable member in broken lines.

FIG. 3 is a rear elevational view of the fish head removing apparatus.

FIG. 4 is a plan view of the fish head removing apparatus.

FIG. 5 is a transverse sectional view through the movable member taken on line 5—5, FIG. 4.

Referring more in detail to the drawings:

The reference numeral 1 generally designates an apparatus for removing fish heads in production dressing of fish by cutting transversely through a fish 2 at a location to include the gall bladder (not shown) within a severed head portion 3. The head portion 3 to be severed is held in a selected position relative to cutting means and moved to engage same at a location to sever the head portion 3 from the fish 2 and retain the gall bladder within the severed head portion 3. The preferred location of the cut is immediately rearwardly of the pectoral fins of the fish 2.

The fish head removing apparatus 1 is mounted on a frame 4 which has legs 5 supported on a floor surface 6. The frame 4 supports an upper stationary platform 7 for supporting a body portion 8 of the fish 2, as later described.

The cutting means is illustrated as a band saw 9 supported on the frame 4 and driven by a suitable motor 10 mounted within an enclosure 11 positioned below the stationary platform 7.

In the illustrated structure, the band saw 9 has a drive member 12 rotatably mounted within the enclosure 11 and operatively connected to the drive motor 10 for driving a saw blade 13 around a driven member (not shown) rotatably mounted in a housing 15 positioned above the stationary platform 7.

The saw blade 13 is positioned adjacent one side edge 16 of the stationary platform 7. A fixed partition 17 is mounted on the stationary platform 7 at the side edge 16 and extends upwardly from the stationary platform 7 thereby being positioned to maintain the body portion 8 on the stationary platform 7 and separate from the severed head portions 3.

It is desirable to support the head portion 3 of the fish 2 while cutting same with the band saw 9; therefore, brackets 18 are supported on the frame 4 and extend outwardly therefrom transversely to the side edge 16 of the stationary platform 7. A guideway structure 19 is supported on an upper edge of the brackets 18 and a movable member in the form of a platform 20 is mounted in the guideway structure 19 for movement therealong while supporting the first head portion 3, as later described.

The guideway structure 19 is illustrated as having a planar base 21 extending between the brackets 18 and being supported thereon. A pair of elongate guideways 22 and 23 for directing the movement of the movable platform 20 are formed at opposite side edges of the planar base 21 by flange portions which have edge walls 24 and 25 extending upwardly from opposite side edges of the planar base 21 and ribs 26 and 27 extending inwardly from upper edges of the walls 24 and 25 respectively with flanges 28 and 29 depending from inner edges of the ribs 26 and 27 respectively to form an inverted J-shaped flange portion at each edge of the base 21 thereby defining the guideways 22 and 23. Stop or bumper members 30 are positioned at opposite ends of the guideways 22 and 23 to maintain the movable platform 20 within the guideway structure 19.

The movable platform 20 is illustrated as a generally planar member having a pair of spaced ribs 31 and 32 depending from a lower surface thereof and positioned inwardly of the depending flanges 28 and 29 respectively and substantially parallel therewith. A plurality of axles 33 are mounted in each of the ribs 31 and 32 adjacent a lower edge thereof, whereby spaced wheels 34 are rotatably mounted on the axles 33 for travel within the guideways 22 and 23 between the stops or bumper members 30. The wheels 34 engage the base 21 and are confined within the respective inverted J-shaped guideway thereby restricting the movement of the platform 20 to linear movement toward and away from the saw blade 13 and substantially parallel to the stationary platform 7.

The head portion 3 of the fish 2 must be accurately positioned relative to the saw blade 13 during severing of the head portion 3 from the body portion 8, therefore, fish engaging members 37 are mounted on the movable platform 20 adjacent a side edge 38 thereof for positioning the head portion 3 of the fish 2 relative to the saw blade 13. The side edge 38 of the movable platform 20 is adjacent and spaced from the side edge 16 of the stationary platform 7 and the saw blade 13 is positioned between the side edges 16 and 38.

The fish engaging members 37 are illustrated as a pair of spaced rods 39 and 40 extending upwardly from an upper surface of the movable platform 20 adjacent the side edge 38 thereof with the rods being positioned to engage pectoral fins 41 of the fish 2. The pectoral fins 41 are adjacent the head portion 3, thereby holding the head portion 3 in a fixed position on the movable platform 20 and the body portion 8 in a fixed position on the stationary platform 7, both in a fixed position relative to the saw blade 13. The rods 39 and 40 are positioned to clear the saw blade 13 when the fish 2 is moved toward and beyond said saw blade.

An end wall 42 is mounted on and extends upwardly from the movable platform 20 at a front edge 43 thereof. The end wall 42 is positioned to be grasped by an operator (not shown) while moving the fish 2 toward and beyond the saw blade 13.

A chute 44 is positioned adjacent a rear edge 45 of the stationary platform 7 for receiving the body portion 8 after same is severed from the head portion 3. The chute 44 is positioned below the stationary platform 7 and leads to other processing equipment, such as cleaning operations.

In use, the movable platform 20 is moved to a forward position having the rods 39 and 40 positioned forward of the saw blade 13. A fish 2 which has been previously killed, as by being electrocuted, is placed between the rods 39 and 40 with the head portion 3 on the movable platform 20 and the body portion 8 on the stationary platform 7. The tail 46 of the fish 2 is grasped and the fish 2 is pulled toward the stationary platform 7 to engage the pectoral fins 41 firmly against the rods 39 and 40, thereby holding the fish 2 in a fixed position relative to the rods 39 and 40, and the saw blade 13. An operator (not shown) grasps the tail 46 and the end wall 42 and moves the movable platform 20 forward while pulling on the tail 46 until the fish engages the saw blade 13 at a location adjacent the pectoral fins 41 and spaced slightly toward the tail 46 from the pectoral fins 41. After the head portion 3 and body portion 8 are severed, the body portion 8 is moved into the chute 44 for further processing. The fixed partition 17 maintains the severed portions of the fish at separate locations, whereby the head portions 3 may be suitably disposed of and the body portions 8 placed in the chute 44.

The fish head removing apparatus 1 has a particular advantage as a wide range of body weights, such as in the nature of from eight (8) ounces to three (3) pounds may be production dressed without any adjustment. The location of the rods 39 and 40 is such that the engagement of the pectoral fins 41 therewith properly positions the head portion 3 to be severed relative to the saw blade 13 thereby indexing each fish, of any in the wide range of sizes, by the engagement of the pectoral fins therewith. The spacing between the rods 39 and 40 permits large fish bodies to pass therebetween until engaged by their pectoral fins and also engages the pectoral fins of the small fish all without any adjustment of the spacing of the rods. This permits a plurality of sizes of fish to be intermixed and production dressed in a substantially continuous operation.

It is to be understood that, while I have illustrated and described one form of my invention, it is not to be limited to the specific form or arrangement of parts herein described and shown.

What I claim and desire to secure by Letters Patent is:

1. Fish head removing apparatus comprising:
  (a) cutting means for cutting transversely through a fish adjacent and rearwardly of the pectoral fins, the fish having a gall bladder between the head and the pectoral fins;
  (b) a member for supporting a portion to be severed from the fish, said supporting member and said cutting means being relatively movable whereby said cutting means severs from the fish body said portion to be removed during said relative movement; and
  (c) fish engaging members for holding the portion to be severed in a selected position on said supporting member relative to said cutting means, said fish engaging members being a pair of spaced upstanding narrow members fixed to the support member and engaged by pectoral fins of a fish to be severed with said engaging members being between said pectoral fins and the cutting means, said cutting means severing the fish adjacent to said engaging members and thereby adjacent to and rearwardly of the pectoral fins.

2. Fish removing apparatus comprising:
  (a) cutting means;
  (b) a movable member, said movable member being movable relative to said cutting means;
  (c) means for holding a fish relative to said movable member whereby relative movement of the movable member and cutting means transversely cuts the fish adjacent to and rearwardly of its pectoral fins and the gall bladder is in the head portion severed from the body;
  (d) said fish holding means is a pair of spaced rods extending upwardly from said movable member;
  (e) said rods are positioned to engage the pectoral fins adjacent the body of the fish thereby positioning the portion to be removed in a selected position relative to said cutting means.

3. The fish head removing apparatus as set forth in claim 2 wherein:
  (a) said cutting means is a stationary band saw having a blade positioned adjacent one edge of said movable member, said blade being positioned to clear said rods when said rods are moved toward and beyond said blade.

4. The fish head removing apparatus as set forth in claim 3 including:
  (a) a stationary member for supporting a body portion of the fish; and
  (b) a fixed partition mounted on and extending upwardly from the stationary member, said fixed partition being positioned to maintain the body portion on the stationary member.

5

5. The fish head removing apparatus as set forth in claim 4 including:
   (a) an end wall mounted on and extending upwardly from the movable member, said end wall being positioned to be grasped by an operator while moving the fish toward and beyond the saw blade.

6. The fish head removing apparatus as set forth in claim 5 including:
   (a) chute means adjacent said stationary member for receiving the body portion after the head portion is severed therefrom.

References Cited

UNITED STATES PATENTS

| 2,959,810 | 11/1960 | Cameron | 17—63 |
| 3,461,485 | 8/1969 | Crepeau | 17—63 |

FOREIGN PATENTS

| 889,787 | 2/1962 | Great Britain | 17—61 |

LUCIE H. LAUDENSLAGER, Primary Examiner